US009335495B2

(12) United States Patent
Hatta et al.

(10) Patent No.: US 9,335,495 B2
(45) Date of Patent: May 10, 2016

(54) OPTICAL MODULE

(71) Applicant: Mitsubishi Electric Corporation, Tokyo (JP)

(72) Inventors: Tatsuo Hatta, Tokyo (JP); Hiromitsu Itamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 2 days.

(21) Appl. No.: 14/085,866

(22) Filed: Nov. 21, 2013

(65) Prior Publication Data
US 2014/0254973 A1    Sep. 11, 2014

(30) Foreign Application Priority Data

Mar. 8, 2013  (JP) ................................. 2013-046901

(51) Int. Cl.
*G02F 1/035* (2006.01)
*G02B 6/42* (2006.01)

(52) U.S. Cl.
CPC ............ *G02B 6/4208* (2013.01); *G02B 6/4206* (2013.01); *G02B 6/4249* (2013.01); *G02B 6/4265* (2013.01); *G02B 6/4286* (2013.01)

(58) Field of Classification Search
CPC ... G02B 6/4208; G02B 6/4249; G02B 6/4286
See application file for complete search history.

(56) References Cited

U.S. PATENT DOCUMENTS

| 5,568,575 | A | 10/1996 | Sato | |
|---|---|---|---|---|
| 6,304,586 | B1 * | 10/2001 | Pease | ................. H01S 5/02248 356/221 |
| 6,757,499 | B1 | 6/2004 | Aoki | |
| 6,914,916 | B2 * | 7/2005 | Pezeshki et al. | ................. 372/15 |
| 2005/0135751 | A1 * | 6/2005 | Zbinden | ........................ 385/50 |
| 2010/0316074 | A1 | 12/2010 | Fukuda | |
| 2012/0243828 | A1 * | 9/2012 | Suzuki | ........................... 385/32 |

FOREIGN PATENT DOCUMENTS

| JP | 7-154325 A | 6/1995 |
|---|---|---|
| JP | 8-21932 A | 1/1996 |
| JP | 10-213784 A | 8/1998 |
| JP | 2001-85798 A | 3/2001 |

(Continued)

OTHER PUBLICATIONS

Online Merriam-Webster Dictionary, http://www.merriam-webster.com/dictionary/modulator.*
Davidson, Michael W., Light: Particle or a Wave, Aug. 9, 2002, Florida State University, http://micro.magnet.fsu.edu/primer/lightandcolor/particleorwave.html.*
B. Pezeshki et al.; "20-mW Widely Tunable Laser Module Using DFB Array and MEMS Selection", *IEEE Photonics Tech. Letters*, vol. 14, No. 10, pp. 1457-1459, (Oct. 2002).

(Continued)

*Primary Examiner* — Ryan Lepisto
*Assistant Examiner* — Erin Chiem
(74) *Attorney, Agent, or Firm* — Leydig, Voit & Mayer, Ltd.

(57) ABSTRACT

An optical modulator includes: laser diodes disposed in parallel with each other, each laser diode having a different lasing wavelength; optical waveguides disposed in parallel with each other with first ends facing the laser diodes; an optical isolator inserted between the laser diodes and the optical waveguides and attenuating return light reflected from the optical waveguides toward the laser diodes; a lens focusing light emitted from the laser diodes onto the optical waveguides through the optical isolator; an optical switch selecting one of the light beams exiting from the optical waveguides; and an optical modulator modulating the light beam selected by and output from the optical switch.

5 Claims, 6 Drawing Sheets

(56) References Cited

FOREIGN PATENT DOCUMENTS

| | | |
|---|---|---|
| JP | 2001-127377 A | 5/2001 |
| JP | 2011-3591 A | 1/2011 |
| JP | 2011-77069 A | 4/2011 |

OTHER PUBLICATIONS

T. Kurobe et al.; "Development of Full-Band Tunable Laser", *Furukawa Review*, No. 121, pp. 1-4 (2008).

* cited by examiner

OPTICAL MODULE

BACKGROUND OF THE INVENTION

1. Field of the Invention

The present invention relates to an optical module for use in optical communication systems, which serve as infrastructure for the Internet or telephone systems.

2. Background Art

In typical conventional optical modules, the outputs of 12 parallel laser diodes are optically coupled together by an optical coupler. In this case, theoretically, the optical power output from the optical coupler is one-twelfth of the optical power input to the coupler. In order to compensate for this power loss, an optical amplifier is integrated into the module (see, e.g., Furukawa Electric Review, No. 121 (March 2008), pages 1-4). However, the use of such an optical amplifier results in an increase in the power consumption of the optical module. Furthermore, the optical amplifier receives and amplifies unwanted return light reflected within the chip and allows it to reenter the laser diodes. As a result, the widths of the spectral lines in the laser diodes vary in a complicated manner with the intensity and the phase of this return light.

To address this problem, improved optical modules have been proposed in which an array or row of laser diodes and a facing optical switch are optically coupled together and the optical switch is used to switch optical paths (see, e.g., Japanese Laid-Open Patent Publication No. H07-154325).

SUMMARY OF THE INVENTION

In such optical modules it is common practice that laser diodes having a refractive index of approximately 3.5 and a mode field radius of approximately 1 µm are optically coupled to the $LiNbO_3$ optical waveguides of an optical switch which have a refractive index of approximately 2.1 and a mode field radius of approximately 5 µm. However, the mode mismatch results in power loss. As a result, the loss in the laser diodes and in the optical waveguides vary considerably, thereby increasing the total power loss of the module.

Further, light reflected back from the optical waveguides enters the laser diodes, thereby increasing the widths of the spectral lines in the laser diodes. This prevents the optical module from providing high quality light output.

In view of the above-described problems, an object of the present invention is to provide an optical module which can decrease loss and provide high quality light output.

According to the present invention, an optical modulator includes: a plurality of laser diodes disposed in parallel with each other, each laser diode having a different lasing wavelength; a plurality of optical waveguides disposed in parallel with each other in such a manner that one end of each optical waveguide faces the laser diodes; an optical switch selecting one of beams exiting the optical waveguides; an optical modulator modulating beam output from the optical switch; an optical isolator inserted between the laser diodes and the optical waveguides and attenuating return light reflected from the optical waveguides toward the laser diodes; and a lens focusing light emitted from the laser diodes onto the optical waveguides through the optical isolator.

The present invention makes it possible to decrease loss and provide high quality light output.

Other and further objects, features and advantages of the invention will appear more fully from the following description.

DETAILED DESCRIPTION OF THE PREFERRED EMBODIMENTS

Figure 1:
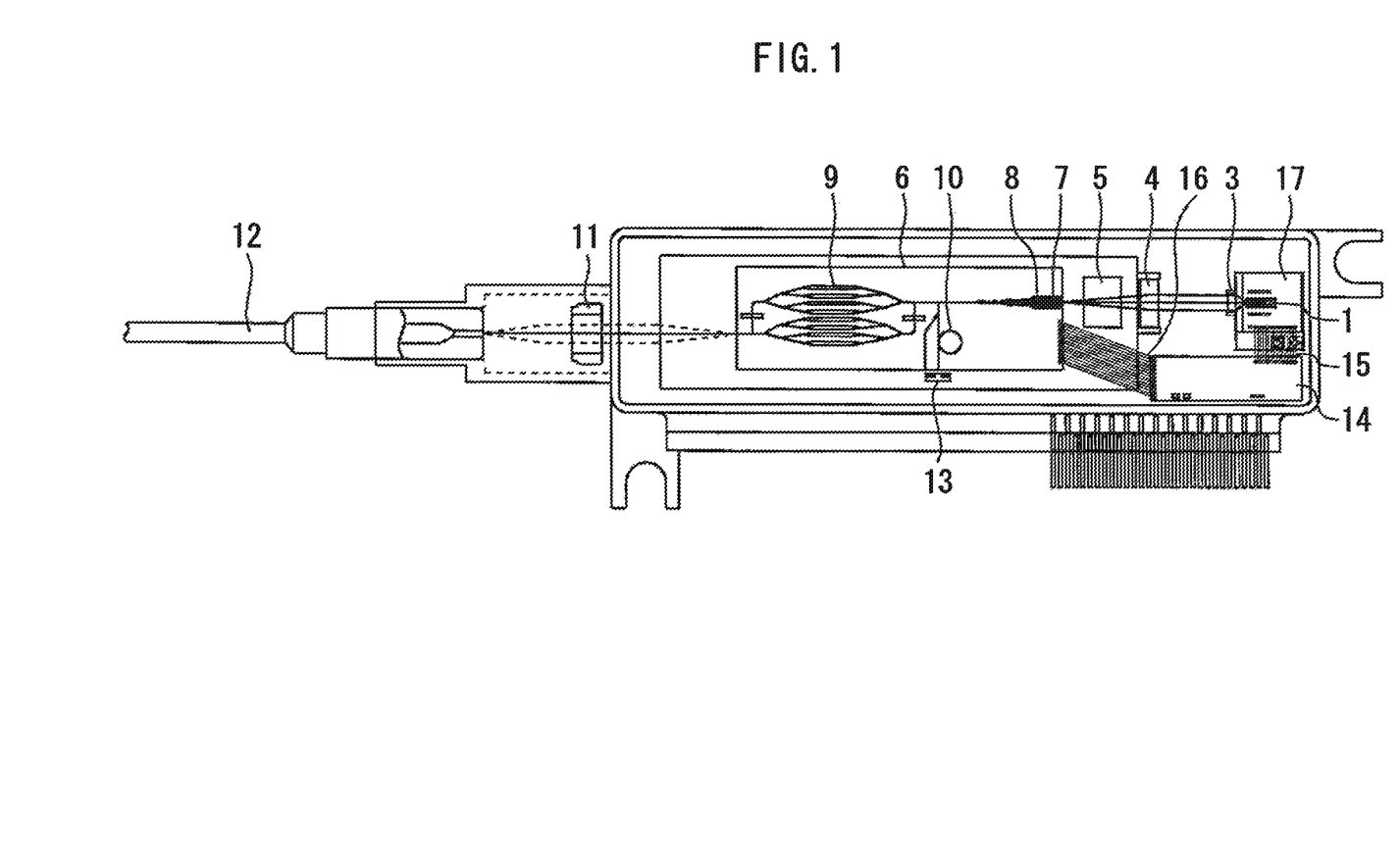
FIG. 1 is a top view of an optical module in accordance with an embodiment of the present invention.
Figure 2:
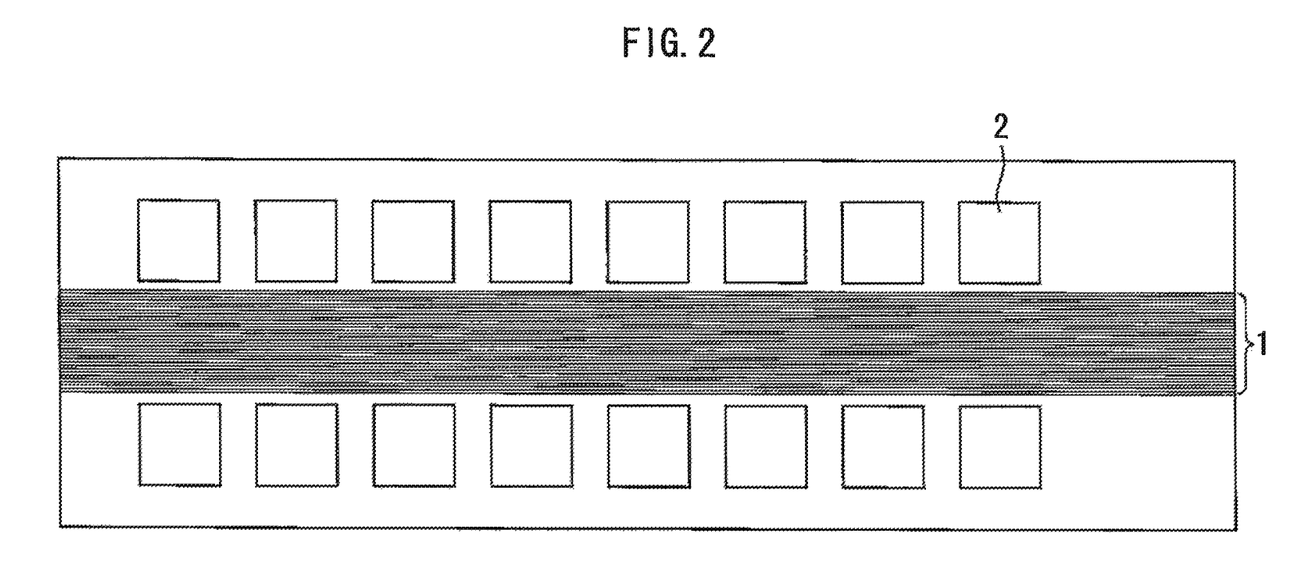
FIG. 2 is an enlarged top view of the laser diode array.
Figure 3:
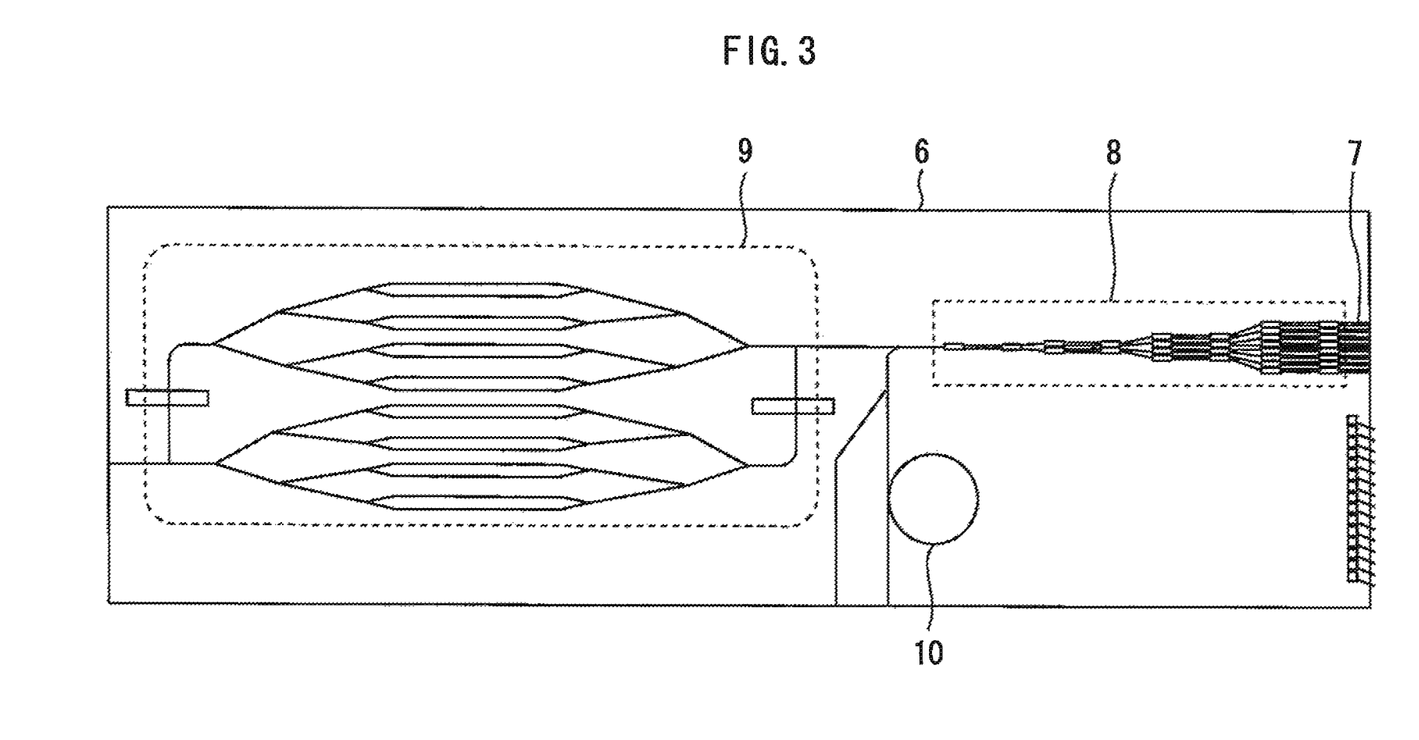
FIG. 3 is an enlarged top view of the modulator device.
Figure 4:
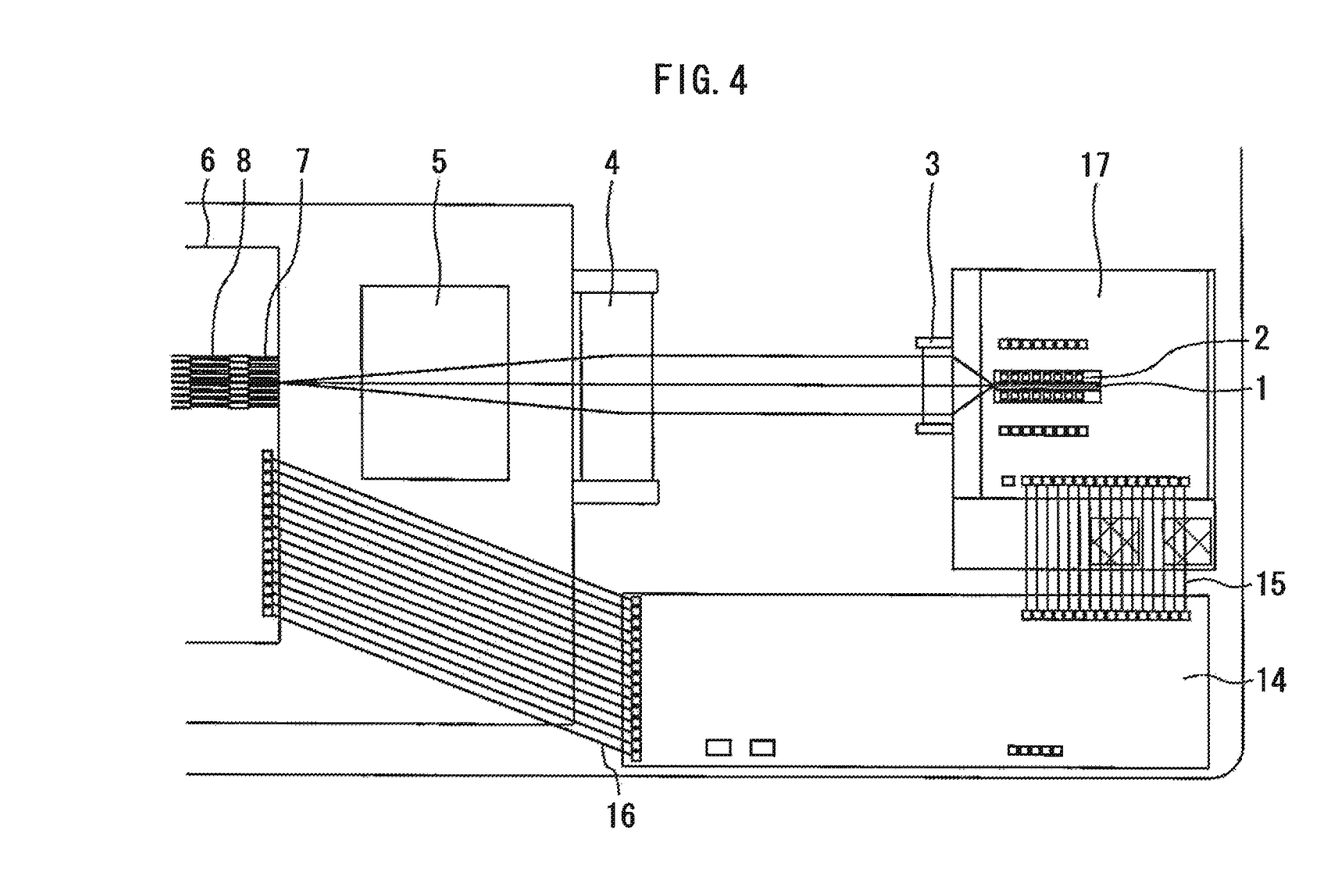
FIG. 4 is an enlarged top view of the control unit.

FIG. 1 is a top view of an optical module in accordance with an embodiment of the present invention. FIG. 2 is an enlarged top view of the laser diode array. FIG. 3 is an enlarged top view of the modulator device. FIG. 4 is an enlarged top view of the control unit.

The laser diode array includes a plurality of parallel laser diodes 1, each having a different lasing wavelength. The laser diodes 1 are distributed feedback (DFB) laser diodes and are 16 in number. Their lasing wavelengths differ by increments of approximately 3 nm. The electrodes 2 of the laser diodes are monolithically integrated on the upper surface side of the laser diode array by a manufacturing process.

A collimator lens 3 having a focal length of 1 mm is disposed so as to receive light emitted from the laser diodes 1. A first condenser lens 4 having a focal length of 5 mm is disposed in the optical path traveled by the light that has exited the collimator lens 3. An optical isolator 5 is disposed in the optical path traveled by the light that has exited the first condenser lens 4. An optical modulator device 6 is disposed at the focal point of the laser light focused by the first condenser lens 4.

The optical modulator device 6 is a functional device formed of a polymer material, namely, a silicone polymer. The optical modulator device 6 includes a plurality of optical waveguides 7, an optical switch 8, an optical modulator 9, a ring resonator 10, and a group of interconnecting optical waveguides, all of which are monolithically formed together by spin coating and dry etching.

The optical waveguides 7 are disposed in parallel with each other in such a manner that one end of each optical waveguide 7 faces the laser diodes 1. The optical switch 8 is a 16:1 optical switch and selects one of the beams exiting the 16 optical waveguides 7. The optical modulator 9 is a 100 Gbps dual polarization-quadrature phase shift keying (DP-QPSK) modulator and modulates the beam output from the optical switch 8.

A second condenser lens 11 focuses the beam output from the optical modulator device 6 onto the receiving end of the optical fiber 12. The ring resonator 10 is inserted between the optical switch 8 and the optical modulator 9. Specifically, an optical path extends from a point between the optical switch 8 and the optical modulator 9 and passes through the ring resonator 10. A 2-photodiode array 13 is disposed at the terminal end of the optical path. The ring resonator 10 and the 2-photodiode array 13 form a wavelength monitor for monitoring the wavelength of the beam output from the optical switch 8.

The control unit 14 is electrically connected to the laser diodes 1 by a group of wires 15 and also electrically connected to the optical modulator device 6 by a group of wires 16. A Peltier device 17 is disposed under the laser diodes 1 and used to heat and cool them.

Further, the optical switch 8 and the optical modulator 9 have the same function to switch optical paths. However, the optical modulator 9 switches optical paths at a high speed and the optical switch 8 switches them at a low speed. Therefore, the optical switch 8 is configured of a plurality of staged interferometers and the optical modulator 9 is configured of Mach-Zehnder interferometers. Both the optical switch 8 and the optical modulator 9 are formed by monolithic integration.

Figure 5:
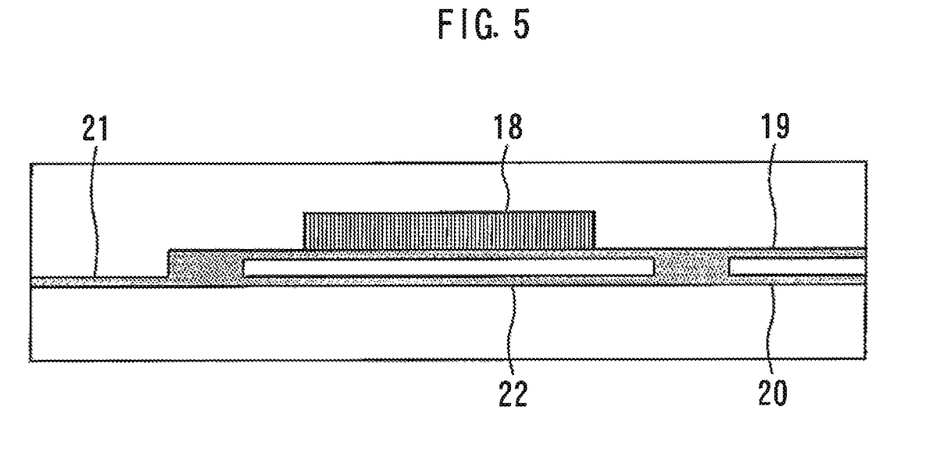
FIG. 5 is an enlarged top view of one of the interferometers constituting the optical switch or the optical modulator.

FIG. 5 is an enlarged top view of one of the interferometers constituting the optical switch or the optical modulator. This interferometer has a group of optical waveguides formed by burying or enclosing a high refractive index region in a polymer film, and also has an optical switch electrode 18. The group of optical waveguides includes a first input optical waveguide 19, a second input optical waveguide 20, an output optical waveguide 21, and a Mach-Zehnder interferometer waveguide 22 which extends from the first and second input optical waveguides 19 and 20 to the output optical waveguide 21.

The refractive index of the polymer film material varies with the voltage applied thereto. The Mach-Zehnder interferometer waveguide 22 includes two parallel-connected optical waveguides, and the difference in phase between these two optical waveguides varies with the voltage applied to the optical switch electrode 18. Therefore, the output optical waveguide 21 can be selectively connected to either the first input optical waveguide 19 or the second input optical waveguide 20 by varying the voltage applied to the optical switch electrode 18.

Figure 6:
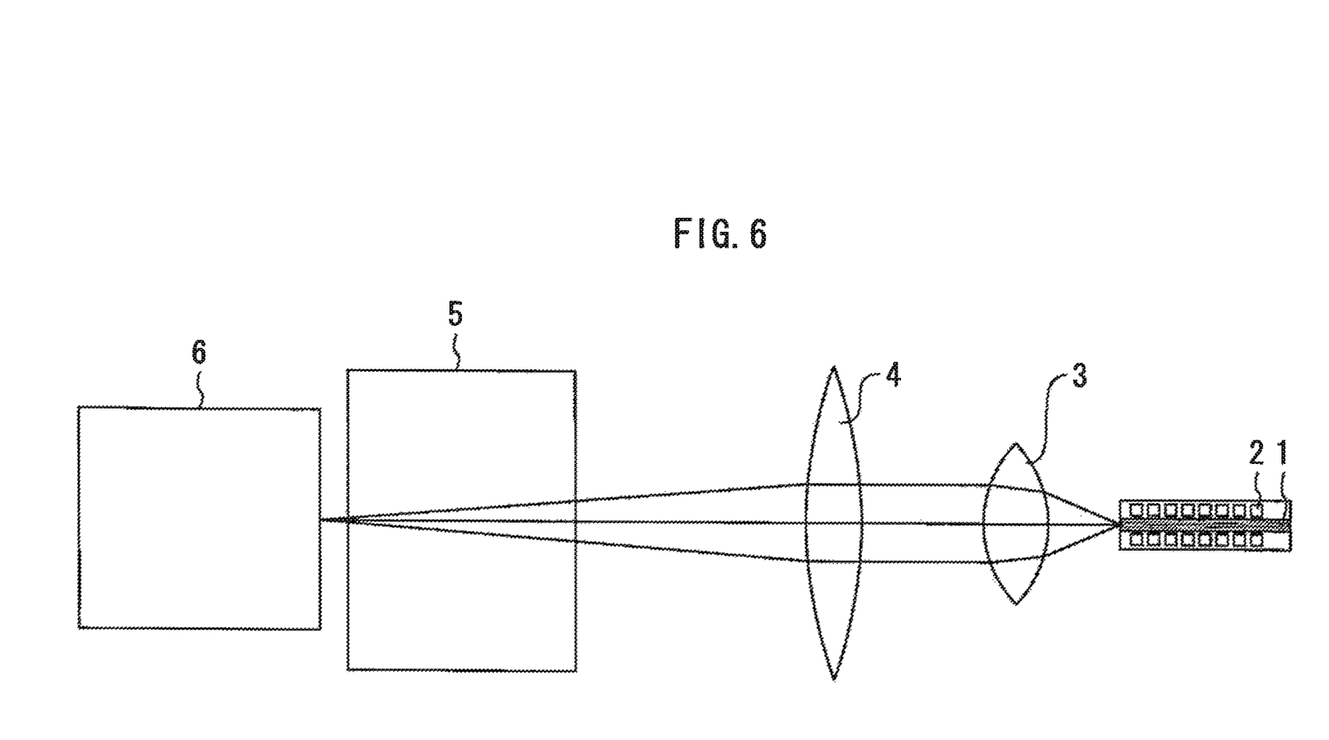
FIG. 6 is an enlarged top view of the collimator lens, the condenser lens, and the optical isolator.

FIG. 6 is an enlarged top view of the collimator lens, the condenser lens, and the optical isolator. The optical isolator 5 is inserted between the laser diodes 1 and the optical waveguides 7 and serves to attenuate the return light reflected from the optical waveguides 7 toward the laser diodes 1. It should be noted that digital coherent optical communication systems require light having a spectral line width of no more than 500 kHz. In order to generate such light, the optical isolator 5 must have an isolation of 60 dB or more. Therefore, the optical isolator 5 is configured to attenuate the return light by 60 dB or more. The collimator lens 3 and the first condenser lens 4 focus the light emitted from the laser diodes 1 onto the receiving ends of the optical waveguides 7 through the optical isolator 5.

The operation of the optical module of the present embodiment will be described. First, the control unit 14 receives from an external system a 5-bit digital signal for selecting one of the 16 laser diodes 1, the selected laser diode 1 being configured to emit a beam of a particular wavelength. In response, the control unit 14 applies a current of 300-400 mA to the selected laser diode 1 to turn it on while turning off the remaining laser diodes 1. The selected laser diode 1 then emits a beam of the particular wavelength. The diameter of this beam is then increased to 5 times the spot size by the collimator lens 3 and the first condenser lens 4, and the beam is then coupled to the receiving ends of the 16 arms of the optical switch 8 in the optical modulator device 6 without any loss.

The control unit 14 then applies a voltage to the electrodes of the optical switch 8 so that the beam emitted from the turned-on laser diode 1 suffers only minimal power loss within the optical switch 8 before it is directed into the optical modulator 9.

The optical modulator 9 converts the beam received from the optical switch 8 into a 100 Gbps phase-modulated signal. This phase-modulated signal is directed to the optical fiber by the second condenser lens 11 and then is transmitted through the optical fiber to a long-distance optical fiber communication network (not shown).

Thus, the optical module is configured as a tunable optical source wherein one of the 16 laser diodes 1 is selectively operated to provide a particular wavelength of light in the C-band. It should be noted, however, that the wavelength of the selected laser diode 1 may not be exactly equal to the wavelength required by the transmission line used, in which case it is necessary to fine tune the wavelength of the laser diode 1. The Peltier device 17 and the wavelength monitor are provided for this purpose.

Light is tapped from the optical waveguide between the optical switch 8 and the optical modulator 9 and split into two portions. One of these portions is then transmitted through the ring resonator 10 (whose transmittance varies at 50 GHz) to the 2-photodiode array 13, while the other portion is transmitted directly to the 2-photodiode array 13 without passage through the ring resonator 10. The 2-photodiode array 13 then generates an electrical signal dependent on the wavelength of the tapped light. This signal is used to control the heating or cooling function of the Peltier device 17 so that the lasing wavelength of the laser diode 1 is tuned to an ITU-T grid wavelength.

As described above, in the present embodiment, the optical switch 8 is used to select the beam emitted from one of the laser diodes 1. The optical switch 8 is configured of 4 staged interferometers and is capable of lossless operation (theoretically). In practice, however, the optical switch 8 exhibits a loss of approximately 2 dB due to the scattering loss, etc. in its waveguide. However, if the optical switch 8 is replaced by an optical coupler, as in the prior art, the optical coupler will exhibit a loss of 12 dB or more. That is, the loss in the optical switch 8 is 10 dB or more lower than the loss in the optical coupler. For example, when the optical switch 8 receives an optical power of 20 dBm from the laser diodes 1, the optical power output from the optical switch 8 is approximately 18 dBm.

Each laser diode 1 emits a beam from a spot approximately 1 μm in size, and this beam has a divergence angle (full-width at half-maximum) of approximately 20-40 degrees due to diffraction. The optical isolator 5 requires an optical transmission path length of approximately 1 mm. This means that since the optical isolator 5 is disposed between the laser diodes 1 and the optical waveguides 7, the laser diodes 1 are separated from the optical waveguides 7 by a distance at least equal to the optical transmission path length of the optical isolator 5 (i.e., approximately 1 mm). As a result, if it were not for the collimator lens 3 and the first condenser lens 4, most of the light emitted from the laser diodes 1 would be diffused during its passage through the optical isolator 5 and would not be coupled to the optical waveguides 7, since the laser diodes 1 have a spot size of 1 μm and the optical waveguides 7 have a spot size of approximately 5 μm. In order to avoid this, the collimator lens 3 and the first condenser lens 4 are provided to couple the light emitted from each laser diode 1 to the optical waveguides 7, resulting in decreased loss in the optical module.

Further, the optical isolator 5 prevents the light reflected from the optical waveguides 7 from returning to the laser diodes 1, which would otherwise result in increased width of the spectral lines in the laser diodes 1. This allows the optical module to provide high quality light output.

Further, the optical switch 8 is configured of a plurality of staged interferometers using the electro-optic effect of polymer waveguides and hence does not require a moving mechanical component such as an MEMS mirror, thus eliminating or minimizing the possibility of frequency noise or optical output noise being externally induced.

Further, since the optical switch 8 and the optical modulator 9 are both configured of interferometers of polymer material, they can be monolithically integrated together, resulting in decreased power loss and decreased cost of the optical module.

Further, the wavelength monitor for monitoring the wavelength of the light output from the optical switch 8 is monolithically integrated into the optical modulator device 6. In this way the wavelength monitor does not require an additional expensive optical system (lenses, etc.), making it possible to reduce the size and cost of the optical module.

It should be noted that typical conventional optical modulators are made of a semiconductor material or lithium niobate. However, these materials have not been used to form wavelength monitors, since the refractive indices of the materials cannot be accurately controlled. Therefore, there have been no wavelength monitors which are integrated into an optical modulator device. In the present embodiment, however, the wavelength monitor can be integrated into the optical modulator device 6, since they are made of polymer material, whose refractive index can be accurately controlled.

It should be noted that a wavelength monitor is essential to tunable optical sources for DWDM optical communication. In the present embodiment, the wavelength monitor is configured of the ring resonator 10 and hence does not use an expensive optical system such as an etalon or lens, resulting in reduced size and cost of the optical modulator. Further, since the ring resonator 10 is provided on the input side of the optical modulator 9, it is possible to accurately monitor the unmodulated light exiting the optical switch 8, which light has a narrow line width.

Further, the control unit 14 selectively turns on one of the laser diodes 1 and then controls the optical switch 8 to select the light emitted from that laser diode 1 that is turned on. This means that it is possible to accurately control the current of the 16 laser diodes 1 and control switching of the optical switch 8 (which is made up of a group of fifteen 1:2 interferometer optical switches) merely by using a 5-bit digital signal. Thus the control of the optical module is simplified, thereby facilitating the operation of the optical module and preventing its erroneous operation.

Although the optical modulator 9 of the present embodiment is a 100 Gbps DP-QPSK modulator, it is to be understood that it is possible to use a modulator using a different modulation system or supporting a different bit rate, such as an on-off keying (OOK) modulator, a differential phase shift keying (DPSK) modulator, or a quadrature amplitude modulation (16QAM) modulator, while retaining the advantages described above.

Obviously many modifications and variations of the present invention are possible in the light of the above teachings. It is therefore to be understood that within the scope of the appended claims the invention may be practiced otherwise than as specifically described.

The entire disclosure of Japanese Patent Application No. 2013-046901, filed on Mar. 8, 2013. including specification, claims, drawings. and summary, on which the Convention priority of the present application is based, is incorporated herein by reference in its entirety.

What is claimed is:

1. An optical module comprising:
   a plurality of laser diodes disposed in parallel with each other, each laser diode having a different lasing wavelength;
   a plurality of optical waveguides having first and second ends and disposed in parallel with each other, with the first end of each optical waveguide facing the laser diodes, wherein light from the laser diodes exits from the second ends of the optical waveguides as light beams;
   an optical isolator inserted between the laser diodes and the optical waveguides and attenuating return light reflected from the optical waveguides toward the laser diodes;
   a lens focusing light emitted from the laser diodes onto the optical waveguides through the optical isolator;
   an optical switch selecting one of the light beams exiting the second ends of the optical waveguides and outputting the light beam selected;
   an optical modulator modulating the light beam selected and output from the optical switch; and
   a wavelength monitor for monitoring wavelength of the light beam output from the optical switch, wherein the wavelength monitor is monolithically integrated with the optical modulator.

2. The optical module according to claim 1, wherein the optical switch includes a plurality of staged interferometers.

3. The optical module according to claim 1, wherein the optical switch and the optical modulator are monolithically integrated.

4. The optical module according to claim 1, wherein the wavelength monitor includes a ring resonator inserted between the optical switch and the optical modulator.

5. The optical module according to claim 1, further comprising a control unit selectively turning on only one of the laser diodes and controlling the optical switch to select the light emitted from the laser diode that is turned on.

* * * * *